US007559842B2

(12) United States Patent
Ishii et al.

(10) Patent No.: US 7,559,842 B2
(45) Date of Patent: Jul. 14, 2009

(54) GAME SYSTEM, GAME CONTROL METHOD, AND RECORDING MEDIUM FOR THE SAME

(75) Inventors: Koichi Ishii, Tokyo (JP); Akihiko Matsui, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 552 days.

(21) Appl. No.: 10/294,616

(22) Filed: Nov. 15, 2002

(65) Prior Publication Data
US 2003/0092492 A1    May 15, 2003

(30) Foreign Application Priority Data
Nov. 15, 2001 (JP) ............................. 2001-350502
Nov. 22, 2001 (JP) ............................. 2001-357508

(51) Int. Cl.
A63F 13/00 (2006.01)
(52) U.S. Cl. ............................. 463/42; 463/1; 463/30
(58) Field of Classification Search .................... 463/42, 463/43, 1, 2, 30
See application file for complete search history.

(56) References Cited

U.S. PATENT DOCUMENTS

| 5,885,156 A | 3/1999 | Toyohara et al. |
| 6,009,458 A * | 12/1999 | Hawkins et al. ............. 709/203 |
| 6,253,167 B1 * | 6/2001 | Matsuda et al. ............... 703/11 |
| 6,267,677 B1 * | 7/2001 | Tajiri et al. .................... 463/43 |
| 6,579,176 B2 * | 6/2003 | Wen et al. ....................... 463/9 |
| 6,656,051 B2 * | 12/2003 | Ishii et al. ..................... 463/43 |
| 2002/0086733 A1 * | 7/2002 | Wang ........................... 463/42 |

FOREIGN PATENT DOCUMENTS

| EP | 0976432 | 2/2000 |
| JP | 2000-107460 | 4/2000 |

OTHER PUBLICATIONS

Super Famicom Dragon Quest III and the Legend . . . a Formal Guide Book, Enix Corp., May 10, 1997, fifth edition, pp. 14 and 15 (List of Characters), with English language translation.
English Language Abstract for JP 2000-107460.

* cited by examiner

*Primary Examiner*—Ronald Laneau
*Assistant Examiner*—Ross A. Williams
(74) *Attorney, Agent, or Firm*—Greenblum & Bernstein, P.L.C.

(57) ABSTRACT

A game system provides multiple classifications of character characteristic and is capable of advancing a game by assigning the desired characteristic to a character from multiple characteristics. Two jobs, that is, a main job and a support job are selectable for a character and a fixed pattern of table configuration data is provided as characteristic value information according to the job. In addition, the table configuration data corresponding to the classification of the job is extracted and applied to a growth table for each job, and ability values of the main job and support job are weighted differently so as to achieve character characteristic having two job abilities together. Accordingly, it is possible to effectively increase the job types to be assigned to the character and to create an interesting game, while reducing necessary memory capacity.

14 Claims, 17 Drawing Sheets

FIG. 7

| No | JOB NAME | HP | MP | Str | Dex | Agi | - - - - - - - - |
|----|----------|----|----|-----|-----|-----|------------------|
| 1 | WARRIOR | 4 | 0 | 5 | 3 | 3 | - - - - - - - - |
| 2 | MONK | 5 | 0 | 3 | 1 | 1 | - - - - - - - - |
| 3 | WHITE MAGICIAN | 3 | 4 | 3 | 2 | 2 | - - - - - - - - |
| 4 | BLACK MAGICIAN | 1 | 4 | 1 | 3 | 3 | - - - - - - - - |
| 5 | RED MAGICIAN | 2 | 3 | 2 | 3 | 2 | - - - - - - - - |
| 6 | THIEF | 3 | 0 | 3 | 5 | 4 | - - - - - - - - |
| ⋮ | ⋮ | ⋮ | ⋮ | ⋮ | ⋮ | ⋮ | ⋮ |

| Lev | HP0 | HP1 | HP2 | HP3 | HP4 | HP5 | MP0 | MP1 | MP2 | --- | BS1 | BS2 | BS3 | --- | NEXT |
|---|---|---|---|---|---|---|---|---|---|---|---|---|---|---|---|
| 0 | 1 | 10 | 10 | 10 | 10 | 10 | 0 | 0 | 0 | --- | 1 | 2 | 3 | --- | 100 |
| 1 | 1 | 11 | 12 | 13 | 14 | 15 | 0 | 8 | 10 | --- | 2 | 3 | 4 | --- | 200 |
| 2 | 1 | 12 | 14 | 16 | 18 | 20 | 0 | 10 | 12 | --- | 3 | 4 | 5 | --- | 300 |
| 3 | 1 | 13 | 16 | 19 | 22 | 25 | 0 | 12 | 14 | --- | 3 | 5 | 7 | --- | 400 |
| 4 | 1 | 14 | 18 | 22 | 26 | 30 | 0 | 15 | 19 | --- | 4 | 6 | 9 | --- | 500 |
| 5 | 1 | 15 | 20 | 25 | 30 | 35 | 0 | 17 | 25 | --- | 5 | 7 | 13 | --- | 600 |
| 6 | 1 | 16 | 22 | 28 | 34 | 40 | 0 | 19 | 30 | --- | 8 | 15 | 21 | --- | 700 |
| --- | --- | --- | --- | --- | --- | --- | --- | --- | --- | --- | --- | --- | --- | --- | --- |

| JOB NO. | COMMAND | REQUIRED LEVEL |
|---------|---------|----------------|
| 1 | FIGHT | 0 |
| 2 | FIGHT | 0 |
| ⋮ | ⋮ | ⋮ |
| 3 | MAGIC | 0 |
| ⋮ | ⋮ | ⋮ |
| 1 | BLOW | 5 |
| ⋮ | ⋮ | ⋮ |

FIG. 10

| JOB NO. | ADVANCED-LEVEL COMMAND | COMMAND | REQUIRED LEVEL |
|---|---|---|---|
| 3 | MAGIC | KEARU | 3 |
| 3 | MAGIC | KEARU RA | 15 |
| 3 | MAGIC | KEARU GA | 30 |
| ⋮ | ⋮ | ⋮ | ⋮ |

| USER ID | MAIN JOB | SUPPORT JOB | HP | MP | Str | Dex | Agi | |
|---|---|---|---|---|---|---|---|---|
| HA000001 | 1 | 3 | 70 | 30 | 27 | 15 | 19 | --- |
| --- | --- | --- | --- | --- | --- | --- | --- | --- |

| USER ID | JOB NO. | LV | AVAIL. FLAG | JOB NO. | LV | AVAIL. FLAG | — — — | EXP | SUB JOB ENABLE FLAG |
|---|---|---|---|---|---|---|---|---|---|
| HA000001 | 1 | 10 | 1 | 2 | 7 | 1 | — — — | 3500 | 1 |
| HA000002 | 1 | 3 | 1 | 2 | 0 | 1 | — — — | 400 | 0 |
| - - - - - | - - - - - | - - - - - | - - - - - | - - - - - | - - - - - | - - - - - | - - - - - | - - - - - | - - - - - |

GAME SYSTEM, GAME CONTROL METHOD, AND RECORDING MEDIUM FOR THE SAME

CROSS REFERENCE TO RELATED APPLICATIONS

The present disclosure relates to subject matter contained in Japanese Patent Applications No. 2001-350502 filed on Nov. 15, 2001, and No. 2001-357508 filed on Nov. 22, 2001, the disclosures of which are expressly incorporated herein by reference in their entireties.

BACKGROUND OF THE INVENTION

1. Field of the Invention

The present invention generally relates to a game system, which advances a game in accordance with a game program, a game control method, and a recording medium for the same. For example, it relates to a game system capable of changing the job of a character in a role-playing game; a game control method; and a recording medium for the same.

2. Description of the Related Art

In recent years, role-playing games have appeared as one of the game categories for video games. Among the role-playing games, there are games that allow a job determining tendencies in the ability of operated characters to be assigned. In some games, jobs of characters are set from the beginning of the game or may be selected at the beginning of the game. In the games, the ability to which characteristics of the job of a user-operated character are reflected, is brought out.

Some characters gain experience by winning a battle, for example, experiencing varying growth depending on jobs to raise their skill levels. Therefore, there are various ways to participate in the game depending on the job of the character, and this leads to various amusements for the users.

Therefore, depending on the game, it may be possible to change a job allocated to a character during the game. For instance, in Laid-open Japanese Patent Application No. 2000-107460, when changing jobs during a game, advanced level jobs and initial level jobs may be chosen for a job, and the selectable advanced-level jobs are determined in the order of the job history of the characters. Alternatively, job histories may be exchanged among multiple operated characters to facilitate change of advanced-level jobs.

In this manner, it is possible to provide various game progression methods for game players and to increase the variations in the ways to enjoy a game by providing various jobs through an increase in the variety of characteristics for the operated character.

Nevertheless, with the conventional game, distinctive growth characteristics are assigned for each job respectively, and original growth tables for each job are populated. Improvement in skills is achieved according to the growth characteristics while referencing the above-mentioned growth tables when a certain experience is gained by winning a battle, for example.

Therefore, as the number of jobs increases, the number of tables to be populated also increases, and accordingly, a large amount of memory is needed for storing the table data. In addition, since the growth patterns have no relationship with the jobs, it becomes difficult to understand the differences of characteristics of the characters according to the differences of the jobs.

The present invention takes the above-mentioned problems into consideration, and aims to solve the above-mentioned problems, providing an interesting game system and game control method capable of effectively increasing the job types to be assigned to the characters while controlling amount of memory which is needed.

SUMMARY OF THE INVENTION

One embodiment of the present invention includes the following configuration as a means for achieving the above-mentioned objectives. That is, a game system, which, when executing a game by operating a character in accordance with a game program, provides multiple types of characteristic of the character and advances the game by assigning at least one type of characteristic to the character from among the types of characteristic. The game system includes a main characteristic assigning system that assigns one of the types of characteristic to the character, the assigned type of characteristic serving as a main type of characteristic of the character; a support characteristic assigning system that assigns another one of the types of characteristic to the character, the assigned type of characteristic serving as a support type of characteristic of the character. The game system also includes a storage that stores characteristic value information that determines characteristic values of the character; and an application system. The application system extracts characteristic value information corresponding to the main type of characteristic and to the support type of characteristic from the stored characteristic value information, and applies the characteristic value of the character in accordance with the extracted characteristic value information. The game system further includes a controller that controls the character according to the characteristic value applied by the application system.

The application system may weight characteristic value information of the main type of characteristic assigned by the main characteristic assigning system with a first factor to generate a first weighted value, weight characteristic value information of the support type of characteristic assigned by the support characteristic assigning system with a second factor to generate a second weighted value, and sum the first and second weighted values.

In addition, for example, the characteristic value information includes a combination of parameters, has multiple character growth patterns for every parameter, and combines the growth patterns according to the characteristic to be assigned to the character.

The storage stores combined information of the character growth patterns for every characteristic of the character.

In addition, for example, the storage stores characteristic value information common to different characters. The application system may apply the stored characteristic value information, the characteristic value information being assigned for each of the different characters.

The application system may further comprise: a game apparatus that includes the main characteristic assigning system, the support characteristic assigning system, and the controlling system; and a server apparatus. The server apparatus connects to the game apparatus through a communication medium, and includes the storage and the application system. The game apparatus assigns character characteristic using the main characteristic assigning system and the support characteristic assigning system, respectively. The server apparatus receiving characteristic assigning results from the game apparatus, finding and applying characteristic value information for the character, and providing the applied characteristic value information to the game apparatus; and wherein the game apparatus controls the character according to the provided characteristic value information.

As another means for achieving the above-mentioned objectives, one embodiment of the present invention is a game system, which, when executing a game by operating a character in accordance with a game program, provides multiple types of characteristic of the character and advances the game by assigning at least one type of characteristic to the character from among the types of characteristic. The game system includes a storage that stores characteristic value information that determines the characteristic value of the character; and an application system that extracts characteristic value information corresponding to the assigned types of characteristic from the stored characteristic value information, and applies the extracted characteristic value information to the assigned types of characteristic. The characteristic value information includes a combination of parameters, has multiple types of character growth patterns for every parameter, and combines the growth patterns according to the characteristic to be assigned to the character.

An example of the game system according to the present invention includes a game control method in a game apparatus, which, when executing a game by operating a character in accordance with a game program, provides multiple types of characteristic of the character and advances the game by assigning at least one type of characteristic to the character from among the types of characteristic. The game control method includes: assigning one of the types of characteristic to the character, the assigned type of characteristic serving as a main type of characteristic of the character; assigning another one of the types of characteristic to the character, the assigned type of characteristic serving as a support type of characteristic of the character; extracting characteristic value information corresponding to the main type of characteristic and to the support type of characteristic from stored characteristic value information; applying characteristic value of the character in accordance with the extracted characteristic value information; and controlling the character according to the applied characteristic value.

In one embodiment, the characteristic value information of the main type of characteristic is weighted with a first factor to generate a first weighted value, the characteristic value information of the support type of characteristic is weighted with a second factor to generate a second weighted value, and the first and second weighted values are summed.

The characteristic value information may include a combination of parameters, have multiple character growth patterns for every parameter, and combine the growth patterns according to characteristic to be assigned to the character.

As another means for achieving the above-mentioned objectives, one embodiment of the present invention is a game control method in a game apparatus, which, when executing a game by operating a character in accordance with a game program, includes a storage that stores multiple types of characteristic of the character, and is capable of advancing the game by assigning at least one type of characteristic to the character from among the types of characteristic. The game control method includes: providing a combination of parameters having multiple growth patterns for each parameter, based on the stored characteristic value information; extracting characteristic value information corresponding to the assigned types of characteristic from the stored characteristic value information; applying characteristic values of the character in accordance with the extracted characteristic value information; and combining the types of growth patterns according to characteristic to be assigned to the character.

For instance, the game control method may assign the main type of characteristic and the support type of characteristic, and control the character. Moreover, a server apparatus that is connected to the game apparatus through a communication medium, includes the storage, and applies an application characteristic value to the character. The server apparatus receives from the game apparatus character assignment results to find and apply characteristic value information for the character, and provides the applied characteristic value information to the game apparatus. The game apparatus controls the character according to the provided characteristic value information.

As another means for achieving the above-mentioned objectives, one embodiment of the present invention is a computer readable recording medium on which a game program executed by a game apparatus is recorded, which, when executing a game by operating a character in accordance with the game program, includes a storage that stores multiple types of characteristic of the character, and advances the game by assigning at least one type of characteristic to the character from among the plurality of types of characteristic. The game program causes the game apparatus to assign a main type of characteristic to the character; assign a support type of characteristic to the character. The game program also causes the game apparatus to extract characteristic value information corresponding to the assigned types of characteristic from the stored characteristic value information; and apply characteristic value of the character in accordance with the extracted characteristic value information. Further, the game program also causes the game apparatus to control the character according to the applied characteristic value.

In the aspect of the present invention, the game program further causes the game apparatus to weight the characteristic value information of the main type of characteristic with a first factor to generate a first weighted value, weight the characteristic value information of the support type of characteristic with a second factor to generate a second weighted value, and sum the first and second weighted values.

As a further example, the characteristic value information includes a combination of parameters, has multiple character growth patterns for each of the parameters, and combines the growth patterns according to characteristic to be assigned to the character.

As another means for achieving the above-mentioned objectives, one embodiment of the present invention is a computer readable recording medium on which a game program executed by a game apparatus is recorded, which, when executing a game by operating a character in accordance with the game program, includes a storage that stores multiple types of characteristic of the character, and advances the game by assigning at least one type of characteristic to the character from among the types of characteristic. The game program causes the game apparatus to retain characteristic value information for determining the character characteristic; extract characteristic value information corresponding to the assigned types of characteristic from stored characteristic value information; apply characteristic values of the character in accordance with the extracted characteristic value information; and control the character according to the applied characteristic values. The characteristic value information includes a combination of parameters, has mutiple character growth patterns for every parameter, and combines the growth patterns according to characteristic to be assigned to the character.

In one embodiment, the game program further causes the game apparatus to store a combination of information on the growth patterns for each of the characteristics.

BRIEF DESCRIPTION OF THE DRAWINGS

FIG. 7 is a diagram illustrating an exemplary growth table configuration for the jobs of an exemplary embodiment;

FIG. 8 is a diagram illustrating an example of a specific configuration of table configuration data (characteristic value information group) of an exemplary embodiment;

FIG. 9 is a diagram illustrating an example of techniques available for each job of an exemplary embodiment;

FIG. 10 is a diagram for describing an example of controlling the command executable levels of an exemplary embodiment;

FIG. 18 is a diagram illustrating an example of the ability level of operated characters according to an exemplary embodiment; and FIG. 19 is a diagram illustrating an exemplary configuration of a job history management table on the server side according to an exemplary embodiment.

DETAILED DESCRIPTION OF THE INVENTION

An exemplary embodiment of the present invention is described in detail while referencing the drawings. An example of applying the present invention to a game system is described, more specifically, an exemplary role-playing game (RPG) is described. However, the games to which the present invention may be applied are not limited to role-playing games only. The present invention may also be applied to games, including battle games or table games, as long as they are games in which the operated characters mature as they gain experience.

Figure 1:
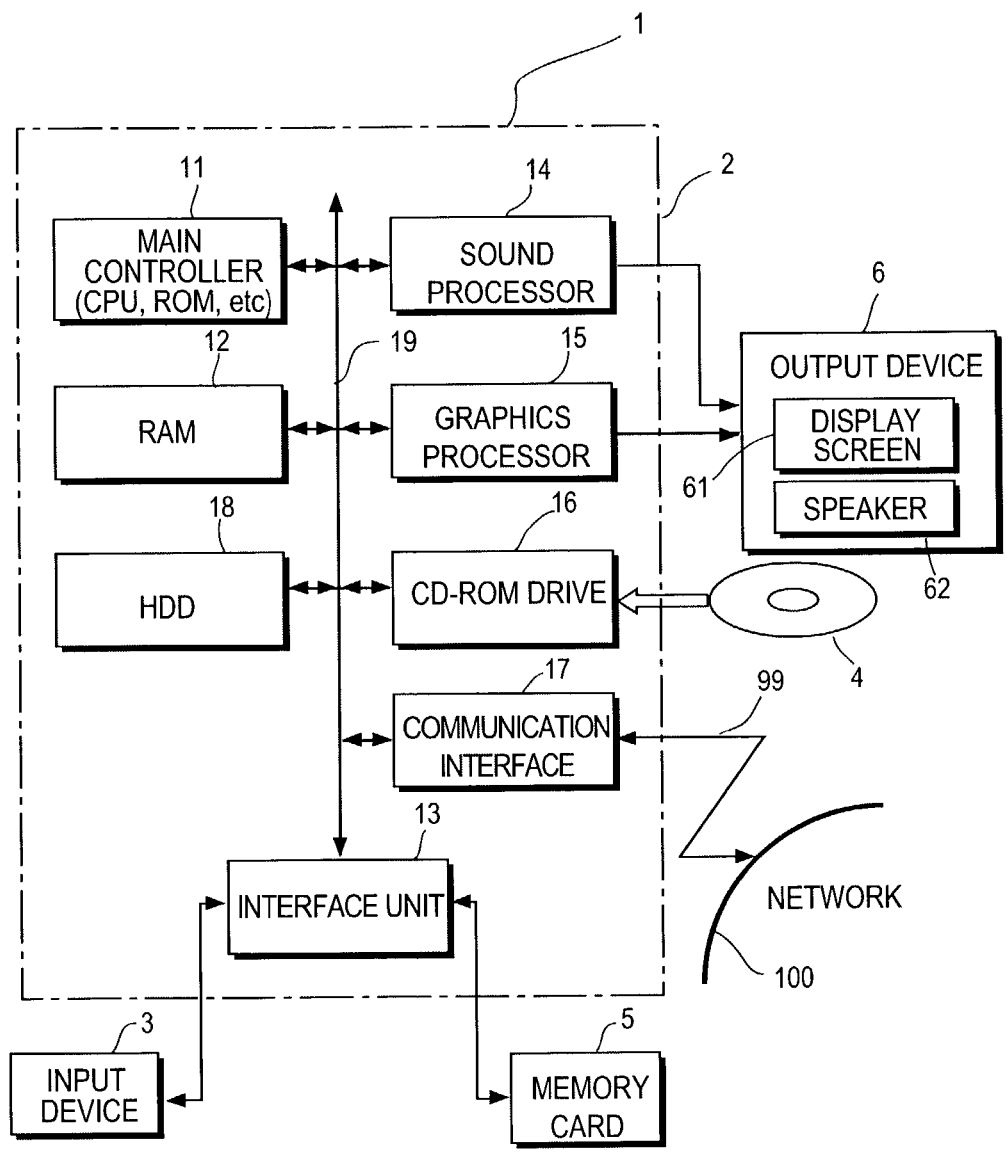
FIG. 1 is a block diagram illustrating the overall configuration of a game system of an exemplary embodiment of the present invention.

FIG. 1 is a block diagram illustrating the overall configuration of a game system of an embodiment according to the present invention. Roughly divided, a game apparatus 1 includes a game apparatus main body 2 having main functions of the game apparatus 1; and an input device 3 (such as a keypad and a controller) to be used for inputting operation commands to the game apparatus main body 2.

In addition, it is possible to load a removable memory card 5, which stores game data such as game progression data or game environment setting data, into the game apparatus main body 2. Moreover, the game apparatus main body 2 is configured to allow execution of a game via a connection to an output device 6 (including, for example, a monitor display and a speaker) that performs screen image display and audio output corresponding to the game contents based on a screen image signal and sound signal from the game apparatus main body 2.

In addition, a compact disc read only memory (CD-ROM) 4 that stores programs for implementing the game-related processing (described later), image data, and sound data, loads into the game apparatus main body 2. Moreover, the game apparatus main body 2 may be connected to a network 100 via an embedded communication interface 17.

The game apparatus main body 2 includes: a main controller 11 including a central processing unit (CPU) and a read only memory (ROM); a random access memory (RAM) 12; an interface unit 13; a sound processor 14; a graphics processor 15; a CD-ROM drive 16 that loads the removable CD-ROM 4 to access its contents; a communication interface 17 that performs data communication with other game machines via a communication medium (network) 100; a hard disk drive (HDD) 18; and a bus 19 that interconnects the above components.

The main controller 11, which includes an oscillator and a timer/counter (neither shown in the figure), generates a clock signal based on a timing signal output from the oscillator in fixed intervals, and performs timekeeping by counting this clock signal using the timer/counter.

The RAM 12 is a main memory unit that the CPU in the main controller 11 uses for executing programs. The RAM 12 stores the programs to be executed by the CPU and the data required for execution thereof. The RAM 12 is also used as a work area during CPU program execution.

The interface unit 13 is configured so that the input device 3 and the memory card 5 are connected in a manner allowing them to be easily detached. This interface unit 13 controls data transfer between each unit (mainly the main controller 11) connected to the bus 19 and the input device 3 or the memory card 5.

The sound processor 14 performs processing for reproducing sound data such as background music (BGM) and sound effects in the game. This sound processor 14 generates a sound signal based on data stored in the RAM 12 and supplies the signal to the output device 6 in accordance with instructions from the main controller 11.

The graphics processor 15, which includes a frame buffer (not shown in the figure), renders images upon the frame buffer in accordance with instructions from the main controller 11. The graphics processor 15 also generates a video signal by adding the predetermined synchronous signal to the image data drawn on the frame buffer, and supplies the signal to the output device 6.

The CD-ROM drive 16 is a read device that reads data stored on the CD-ROM 4, which is an exemplary recording medium. The game apparatus 1 performs game-related control, to be described later, by controlling the game apparatus main body 2 in accordance with a game program recorded on the CD-ROM 4.

The communication interface 17 administers communication control during various types of data exchange and linked games with other communications devices connected to a network 100, such as with servers, or with other game apparatuses via a server.

For instance, the communication interface 17 controls transfer of information (programs and data) between the game apparatus main body 2 and a communication network 100. Game programs and data downloaded from the communication network 100 via the communication interface 17 and communication lines 99 may be stored on the HDD 18.

The HDD 18 is an auxiliary memory unit that is used by the CPU in the main controller 11 for executing programs. Various data and programs including information downloaded via the communication interface 17 and data read out from the CD-ROM 4 may be stored on the HDD 18.

As described above, programs for implementing the game-related processing and for performing communication, image data, and sound data are stored in the CD-ROM 4. The game program includes a program that causes a game execution method according to an exemplary embodiment to be executed in the game apparatus 1. The CD-ROM drive 16 reads the necessary game programs and game data from the game software stored on the CD-ROM 4. The main controller 11 operates in accordance with the read-in program.

The game software read in from the CD-ROM drive 16 or transmitted from the communication network 100 may be pre-installed in the HDD 18. In addition, a sound signal is generated based on data stored in RAM 12 and the signal is supplied to the output device 6 in accordance with instructions from the main controller 11.

The input device 3 includes a controller that is operated by a player to input various game-related commands to the game apparatus main body 2. The input device 3 transmits the instruction signals corresponding to the player's operations to the game apparatus main body 2 via the interface unit 13.

Figure 2A:
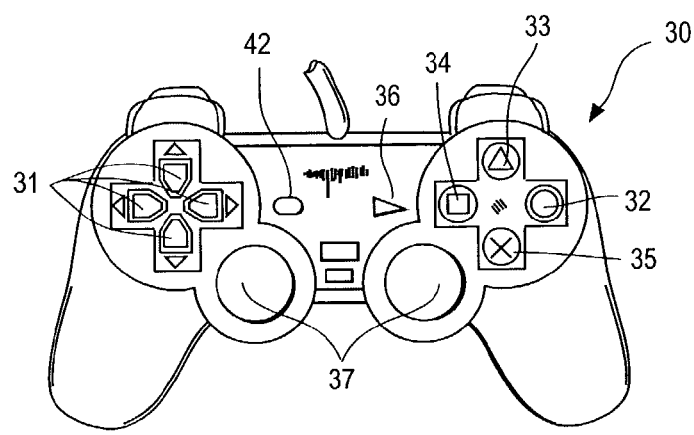
FIG. 2A and FIG. 2B are diagrams for describing an example of an input device of an exemplary embodiment.
Figure 2B:
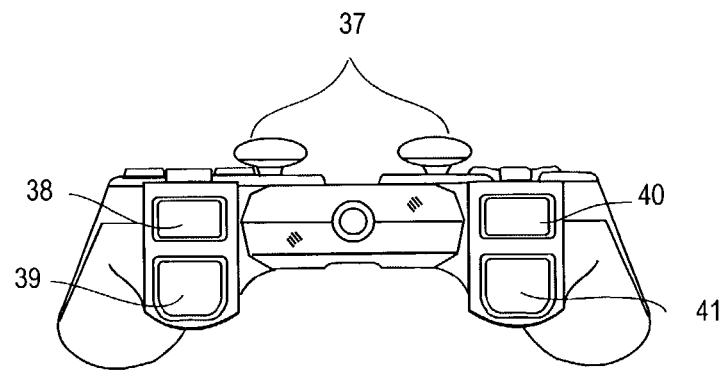

In an exemplary embodiment, a command to proceed with the game is input by the controller. An example where input is performed with a controller being used as the input device 3 is described below. FIG. 2A and FIG. 2B are examples of a configuration of a controller used as the input device 3 of an exemplary embodiment; wherein FIG. 2A illustrates a planar view and FIG. 2B illustrates a back view.

In FIG. 2A and FIG. 2B, the controller 30 is provided with a cross-shape key 31 for inputting movement information and the like, and operation keys (such as ○ button 32, △ button 33, □ button 34, × button 35, start button 36, and select button 42) for inputting various instructions to the game apparatus main body 2.

In addition, the controller 30 is provided with joysticks 37 for inputting movement information. As shown in FIG. 2B, operation keys (keys such as an R1 button 38, R2 button 39, L1 button 40, and L2 button 41) are provided on the back of the controller 30.

All operation keys other than the start button 36 and select button 42 have a pressure-sensitive configuration. In addition, the controller 30 has a vibration function. In other words, the controller 30, which has an embedded motor not shown in the figure, is capable of making the entire controller 30 vibrate through activation of the motor upon reception of a predetermined control signal from the game apparatus main body 2. This allows vibrations to be conveyed to a player holding the controller 30.

The game apparatus main body 2 may also adjust the intensity of the vibration, for example providing three levels of vibration intensities: "strong", "medium", and "weak". The vibrations of controller 30 are intermittent, and it is possible to set vibrations having any of the intensities to occur randomly.

The memory card 5, which is configured with flash memory, is an auxiliary memory unit controlled by the game apparatus main body 2 to store game data. Write-in of data to the memory card 5 and read-in of data from the memory card 5 are controlled by the main controller 11 via the interface unit 13.

Based on an image signal and sound signal from the game apparatus main body 2, the output device 6 displays a game image and outputs sound. In an exemplary embodiment, a speaker-embedded monitor device, for example a television (TV) set, is provided as the output device 6. This monitor device includes a display screen 61 for displaying images, and a speaker 62 for outputting sound.

In addition, the output device 6 displays an image on the display screen 61 in response to a video signal from the graphics processor 15, and outputs sound from the speaker 62 in response to a sound signal from the sound processor 14. Accordingly, the output device 6 functions as both a display device and a sound output device.

The main controller 11 controls operation of the game apparatus main body 2 based on fundamental software stored in ROM and game software that is read out from the CD-ROM 4 via the CD-ROM drive 16 and stored in RAM 12.

For instance, the main controller 11 reads out graphics data from the CD-ROM 4, transfers the data to the graphics processor 15, and sends an image generation instruction to the graphics processor 15. In response to this instruction, the graphics processor 15 generates a video signal utilizing the graphics data. This video signal is transmitted to the output device 6. This causes an image to be displayed upon the display screen of the output device 6.

With the game apparatus including the above-mentioned configuration according to an exemplary embodiment, a network game is configured to allow communication with other game apparatuses via the network 100 and multiple players can participate in a single game via the network 100. In this case, not only can the game program be read out from the CD-ROM 4, but also the configuration allows the game program to be downloaded from other communication machines (server apparatus) connected to the network.

Figure 3:
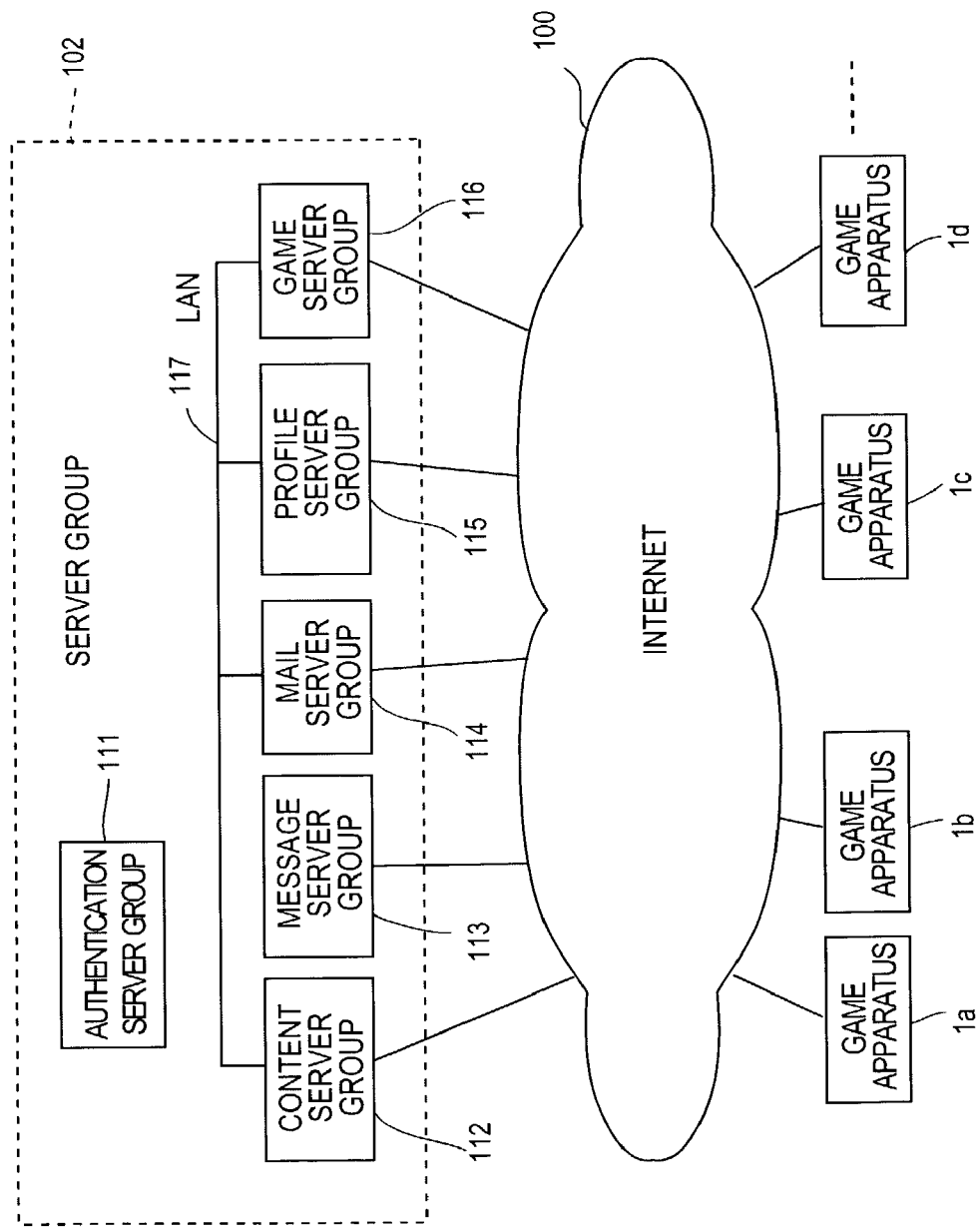
FIG. 3 is a schematic diagram illustrating a configuration of a network game system that provides network-supported game services according to an exemplary embodiment.

In the following, the configuration of the network game system in the case where a network game utilizing the above-mentioned functions is executed is described. FIG. 3 illustrates a schematic configuration of the network game system that provides network-ready game services according to an exemplary embodiment.

With the network game system of an exemplary embodiment, game apparatuses 1a, 1b, 1c, and 1d having the configuration shown in FIG. 1 are connected to a network system through a communication medium. For example, the game apparatuses 1a, 1b, 1c, and 1d are connected to a server group 102 through the network 100, such as the Internet. It should be noted that the number of connected game apparatuses is not limited to that of the example shown in FIG. 3. There is no limitation to the number of connected apparatuses, and naturally a game can be executed by connecting two or any greater, arbitrary number of game machines according to the game contents.

The server group 102 is, for example, configured with an authentication server group 111 that performs account management for user authentication; a content server group 112 that provides an interface between the game apparatus 1 and other server groups and also provides content viewing services, such as for sound and video; a message server group 113 that provides an environment for chatting and messaging; a mail server group 114 that provides electronic mail service; a profile server group 115 that manages user profiles; and a game server group 116 that provides a game environment.

These server groups 111 through 116 are interconnected via a LAN 117. The configuration of the server groups is not limited to the above-mentioned example, but may include other configurations including a configuration having one unit used to configure everything, or a configuration with the parts broken down into smaller, separate components.

The game server group 116 includes a lobby server that executes a game according to an exemplary embodiment. When the game apparatus 1 is connected to a lobby server, a screen that represents a virtual "lobby" is displayed on the display device 6. On this lobby screen, a player's own character and the characters of other players connected to the lobby server are displayed. The players are able to chat, which makes it possible to interact with other players and find a partner to play a game with.

Figure 4:
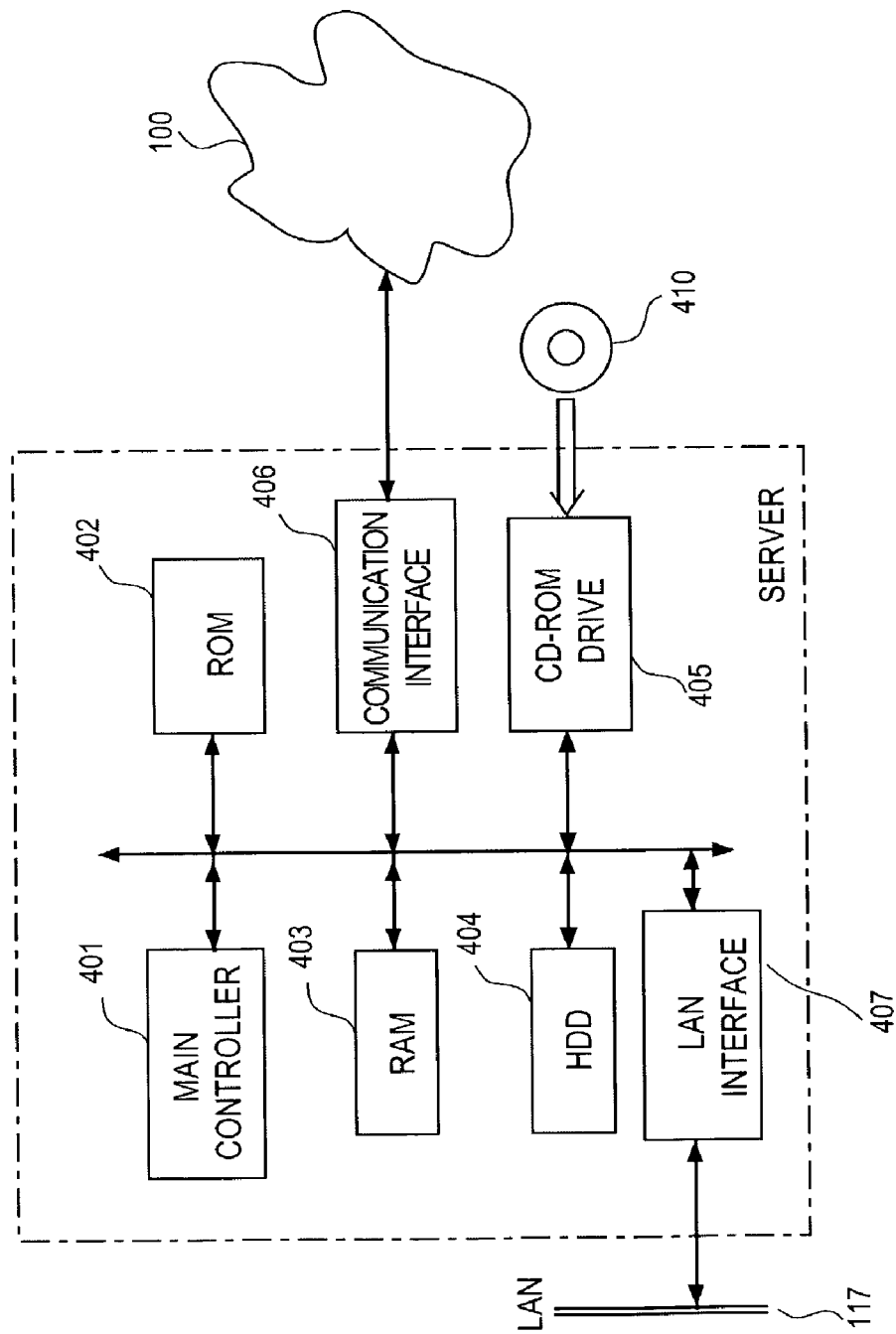
FIG. 4 is a block diagram illustrating a schematic configuration of a server shown in FIG. 3.

A schematic configuration of an individual server shown in FIG. 3 is now described. FIG. 4 is a block diagram illustrating a schematic configuration of the server shown in FIG. 3.

Each server includes a main controller 401 including a CPU; a read only memory (ROM) 402 that stores an operating program and various parameters of the main controller 401; a random access memory (RAM) 403; a large-capacity hard disk drive (HDD) 404 that files and stores various data; and a CD-ROM drive 405 that loads a removable CD-ROM 410 and accesses its contents.

It should be noted that this removable recording medium is not limited to the CD-ROM 410, but a DVD-ROM or a semiconductor memory unit may also be used. Alternatively, multiple types of these media drives may be provided.

In addition, each server includes a communication interface 406 that performs game data communication with the game machine via the communication medium (network) 100; and a LAN interface 407 that administers the interface with the LAN 117 to facilitate information exchanges with other servers.

Figure 5:
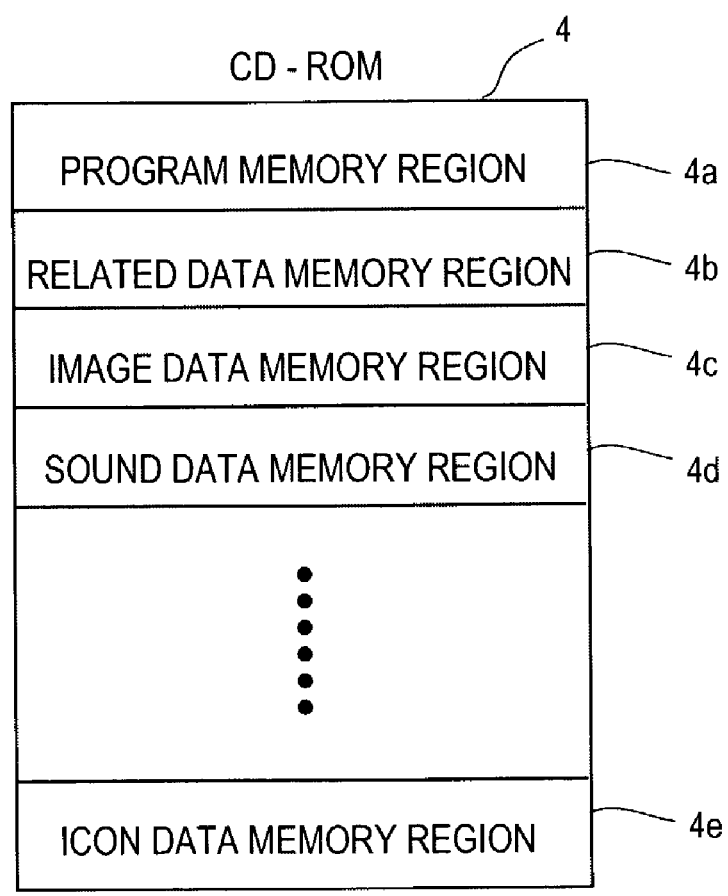
FIG. 5 is a diagram for describing a detailed configuration of a CD-ROM according to an exemplary embodiment.

Next, game programs and data to be stored on the CD-ROM 4 of the game apparatus main body 2 are described. FIG. 5 is a diagram for describing the memory contents and memory regions of the CD-ROM 4.

As shown in FIG. 5, the CD-ROM 4 is configured with a program memory region 4a that stores a game program to be executed with the main controller 11; a related data memory region 4b that stores data needed for proceeding with various games; an image data memory region 4c that stores modeling data of a three-dimensional model and two-dimensional image data used as background; a sound data memory region 4d that stores sound data, such as sound effects; and an icon data memory region 4e that stores game-specific icon information, such as characters appearing in the game.

It should be noted that in an exemplary embodiment, data needed for game continuation at a certain stage is loaded into RAM 12 from data stored in each storage region on the CD-ROM 4, and the game continues based on the data loaded into RAM 12.

If subsequent data becomes needed for game continuation, the required data is loaded into RAM 12 from data stored in each storage region on the CD-ROM 4 at that time.

With the above description, a case where a game apparatus independently performs a game in accordance with a game program stored on the CD-ROM 4 is described as an example, however, in the case of executing a network game, game progress control is performed based on control by the lobby server for executing a game in the game server group 116 of the server group 102. In other words, in accordance with the progress control by the above-mentioned lobby server, either the necessary data is loaded, or data needed for game progression stored in each storage region on the CD-ROM 4 is partially loaded into RAM 12, and the game then proceeds based on the data loaded into RAM 12.

Figure 6:
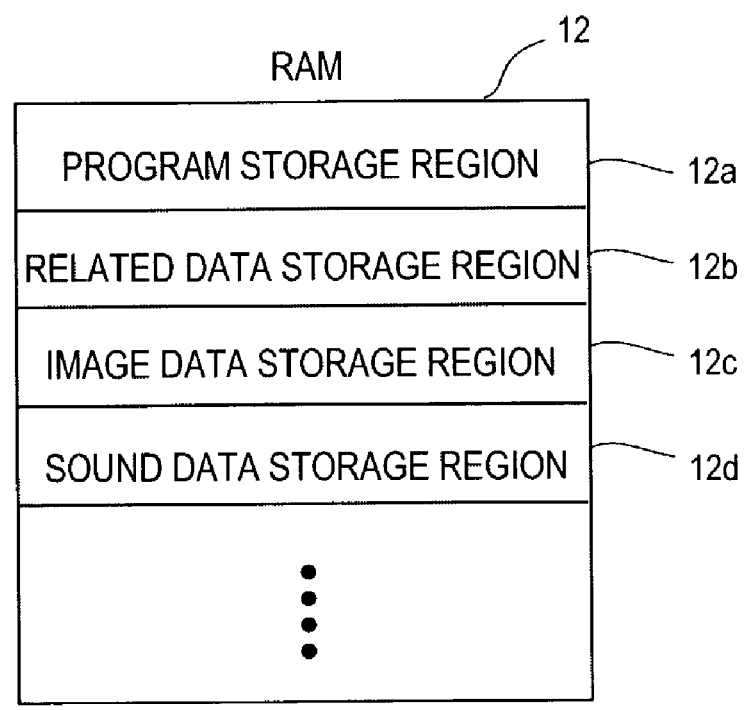
FIG. 6 is a diagram illustrating a RAM memory configuration according to an exemplary embodiment.

Next, programs and data to be stored in RAM 12 are described. FIG. 6 is a diagram illustrating the memory configuration of RAM 12 according to an exemplary embodiment.

As shown in FIG. 6, RAM 12 includes a program storage region 12a that stores programs to be executed by the main controller 11; a related data storage region 12b that stores data needed for executing each processing; an image data storage region 12c that stores image data relating to modeling data of a three-dimensional model and two-dimensional image data used as background; and a sound data storage region 12d that stores sound data such as sound effects.

In an exemplary embodiment, in the case of playing a game with only the game apparatus 1, the game data read out from the memory card 5 upon starting the game is read in to the related data storage region 12b, and the game is resumed in accordance with the read-in game data, except for the case where the game is executed from the beginning.

In the case of performing a network game, game data supplied from the lobby server upon starting the game is stored in the related data storage region 12b, and the game is resumed in accordance with the stored game data, except for the case where the game is executed from the beginning.

In the role-playing game of an exemplary embodiment, classifications for the characteristics of the operated character are provided, and desired characteristics from the characteristic classifications may be assigned to the character.

At least one job is assigned as a characteristic classification of the operated character. The prepared jobs may include, for example: a "Warrior" who is an expert with weapons; a "Monk" who is good at fighting and is a seeker of truth; a "White Magician" who is good at white magic (healing magic) and defensive magic, and has a strong self-sacrificing spirit; a "Black Magician" who is good at black magic (offensive magic), and has knowledge but is egocentric; a "Red Magician" who is a jack of all trades and master of none; a "Thief" who has good sense of direction and is good at stealing personal belongings; a "Knight" who is good at defense; a "Dark Knight" who is good at absorbing the enemy's power and offense; a "Beast Tamer" who is good at handling animals and displays strength in field action; a "Bard" who knows how to make good use of life and is good at minstrelsy; a "Ranger" who is good at remote attacks and archery; a "Samurai" who cuts a person with a single stroke of the sword; a "Ninja" who is good at covert action and the art of making himself invisible; a "Dragon Knight" who is good at wielding a spear and jumping; and a "Summoner" who is good at recalling magic.

As described later in detail, it should be noted that in an exemplary embodiment not all jobs are selectable from the beginning, that is, jobs from the "Warrior" to the "Thief" are jobs that can be engaged in from the initial stage of the game, and jobs from the "Knight" to the "Ranger" are jobs that can be taken on, after gaining experience in predetermined jobs. In addition, jobs from the "Samurai" to the "Summoner", for example, are hidden jobs, so these jobs can be taken on when predetermined events are cleared or when predetermined conditions are satisfied, that is, only a specifically selected character can engage in these jobs.

In an exemplary embodiment, variation is given on the growth pattern of the character according to the characteristics of the operated character. That is, personal ability is improved in accordance with an acquired value, such as an experience value, which is given in the case of winning a battle against a monster during game play, so that this improving ability value varies depending on the job in which the character is engaged.

In such a case, information for determining all of the growth statuses for each job may be thought of as being retained, for example, as an individual table. However, as apparent from the description above, it is necessary to reduce the memory storage capacity needed for storing the tables because specialized techniques often overlap among jobs.

Therefore, an exemplary embodiment does not provide individual table information for each job, but rather, provides fixed-pattern table configuration data (characteristic value information group) as characteristic value information corresponding to the job, extracts the table configuration data (characteristic value information group) corresponding to the classification of the job (assigned characteristic), and performs the process of applying the data to the growth table for each job.

An example of a growth table configuration for each job, which is formed after the above-mentioned processing is performed, is now described. FIG. 7 illustrates an example of a growth table configuration for each job according to an exemplary embodiment. FIG. 8 is a diagram illustrating a specific configuration example of the table configuration data (characteristic value information group) of an exemplary embodiment.

As shown in FIG. 7, the most appropriate growth pattern according to the characteristics of a job has been assigned for each item HP, MP, etc. by figures ranging from 0 to 5, and each of the figures indicates a growth pattern chosen from among six growth patterns. The patterns of FIG. 7 also correspond to the table configuration data (characteristic value information group) HP0, HP1, etc. as shown in FIG. 8. It should be noted that the server side stores this growth table for each job.

In an exemplary embodiment, on the server or game machine side, jobs are specified using a number (job number) added to each job as shown in FIG. 7. For instance, job number 1 is assigned to the "Warrior"; 2 to the "Monk"; 3 to the "White Magician"; 4 to the "Black Magician"; 5 to the "Red Magician"; and 6 to the "Thief".

Similarly, job numbers can be assigned as desired; for example, job number 7 can be assigned to the "Knight"; 8 to the "Dark Knight"; 9 to the "Beast Tamer"; 10 to the "Bard"; 11 to the "Ranger"; 12 to the "Samurai"; 13 to the "Ninja"; 14 to the "Dragon Knight"; and 15 to the "Summoner".

As shown in FIG. 7, to facilitate growth factors for each job, such as "Hit Points (HP)", "Magic Points (MP)", "Strength (Str)", "Dexterity (Dex)", "Agility (Agi)", and the like, the table is configured not by applying the individual specific data but by applying the table configuration data (characteristic information groups) 0 through 5 corresponding to the growth patterns of the characters that engage in a job.

For instance, for the job "Warrior", information group (4) is assigned as "HP", information group (0) as "MP", information group (5) as "Str", information group (3) as "Dex", information group (3) as "Agi", and so forth.

Even there are 15 jobs as described above, each parameter classification (characteristic value information group) includes six types for each classification, it is therefore possible to find a growth pattern for each job by combining each parameter depending on the job.

However, the exemplary embodiment is not limited to the above-mentioned examples, but the parameter classification (characteristic value information group) may have more than six types, or less than six, or the number of types may be different for each item.

Detailed examples of each information group are described with reference to a table of FIG. 8, which is illustrating a specific configuration example of the table configuration data (characteristic value information group) of an exemplary embodiment. The server side also has this table configuration data, and as described later, the server side calculates the characteristic value of the job to be engaged in while referencing this data and transmits it to the game machine side.

As shown in FIG. 8, in the case where the growth level raises sequentially from (0), six types of table configuration data (characteristic value information groups), that is, "HP0" through "HP5" are provided for "HP", which represents the physical strength of the character.

In the specific example shown in FIG. 8, HP is (1) in all of levels 0 through 6 for "HP0"; and for "HP1", HP is (10) in level 0, (11) in level 1, (12) in level 2, (13) in level 3, (14) in level 4, (15) in level 5, (16) in level 6, and so forth. Similarly, for "HP2", HP is (10) in level 0, (12) in level 1, (14) in level 2, (16) in level 3, (18) in level 4, (20) in level 5, (22) in level 6, and so forth.

As with the above, the HP maximum values corresponding to the character levels are also provided for "HP3", "HP4", and "HP5".

As with the above, the acquired point values corresponding to the character levels are different for other parameters, such as MP representing magic power, and Str representing endurance of damage done, for example, by blows in the battle. Therefore, job selection may greatly influence game progression.

"Str (strength)", "Dex (dexterity)", "Agi (agility)", and the like shown in FIG. 7 are parameters representing the defensive strength and offensive strength in the battle and each value corresponding to the respective level falls within a predetermined range. Accordingly, with an exemplary embodiment, such parameters are regarded as battle skills (BS). The six types of BS: "BS1", "BS2", "BS3", and the like, are regarded as growth patterns.

Values in the "NEXT" column of FIG. 8 represent the experience values to be acquired by the character, by the time he reaches the next level; wherein the necessary experience value differs depending on the number of monsters that the character defeats in battle and on its strength. Generally, the strength of the monster is controlled so as to increase and accordingly the experience value to be acquired during battle progression increases as the level of the character rises.

In addition, in an exemplary embodiment, the operations (commands) available for the character in battle are determined according to the character's level, and techniques that can be used by specifying the commands and types of magic that can be invoked increase as the character's level rises.

For instance, the levels required for executing each command have been determined for each job (job number) as shown in FIG. 9. FIG. 9 illustrates an example of techniques available for each job of an exemplary embodiment. This information is needed for character operation, therefore not only does the server side stores this information, but the game apparatus side also retains this information by downloading it from the server side.

As shown in FIG. 9, the level required to use the "Fight" command is, for example, level 0 for the Warrior (job number 1) and Monk (job number 2), that is, they can use the command from the beginning of the game. Meanwhile, the level required to use the "Magic" command is, for example, level 0 for the White Magician (job number 3), that is, he can use the command from the beginning of the game.

However, the Warrior (job number 1) cannot execute the "Blow" command until reaching level 5. Thus, a certain level must be reached to execute the high-level commands.

Taking "Magic" as an example, various types are provided, that is, there are multiple types: from magic that has small effects to magic that has large effects. With this same kind of magic, magic that has large effects can be executed when the character level rises.

FIG. 10 is a diagram for describing an example of controlling the command executable levels of an exemplary embodiment. As shown in FIG. 10, in the case of recovery magic, which is healing magic, for example, the character with job number 3 (White Magician) is controlled to use the command (magic word) of "Kearu", so that the lowest amount of recovery is invoked as magic in required level 3; when using the command of "Kearu Ra", a medium amount of recovery is invoked in required level 15; and with using the command of "Kearu Ga", a large amount of recovery is invoked after reaching level 30. This information, which is needed for character operation, is stored not only on the server side, but the game apparatus side also downloads this information from the server side and stores it.

In an exemplary embodiment, the operator can select a job for a character to be operated and can utilize the growth pattern in accordance with the selected job. In this case, since common growth parameters can be unified, even if there are a large number of selectable jobs, it is possible to reduce the memory capacity needed for controlling the selected jobs.

In addition, in an exemplary embodiment, in order to diversify the game, it is possible to assign one job to one character. In addition, it is also possible to assign one additional job to the character.

In other words, an exemplary embodiment uses a configuration including a function to assign a main job (main characteristic) to a character as well as a function to assign a secondary or support job (support characteristic) to the same character. It should be noted that an example of assigning two jobs is described below, however, the present invention is not limited to this example, and naturally three or more jobs may be assigned to one character.

Here, the main job and secondary job are determined, and reflection of the characteristic value (see FIG. 8) of the second or lower job on the character is suppressed to be lower than that of the main job. In other words, with respect to reflection effects of characteristic values, the support job characteristic value is weighted to 50% of the main job characteristic value, or lower than 50%, and the character characteristic values are calculated on the basis of the characteristic values that are found by adding each job's weighted characteristic value together. Through such control, it is possible to give further variations to the growth pattern of an operated character and to present the user with a challenge.

Next, a game progression control allowing a character to engage in multiple jobs at the same time is described.

It should be noted that in the following description, the case of executing a network game using the server group 102 is described as an example. Therefore, the game apparatus executes the game according to the game control by the server group 102, and the server group 102 retains each table shown in FIG. 7 through FIG. 10, calculates the ability values of the characters operated by the game apparatus side, and transmits the values to the game apparatus.

Figure 11:
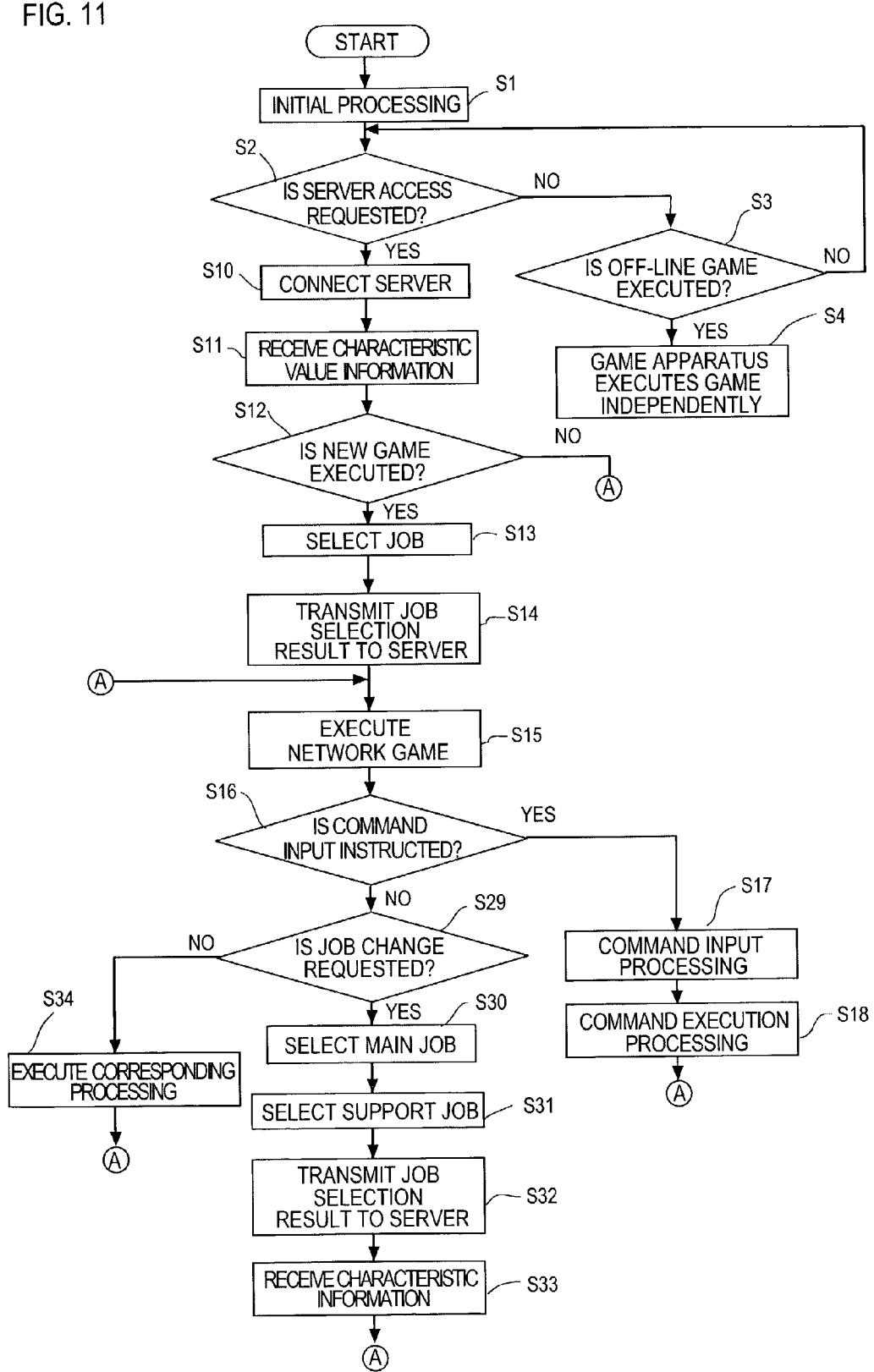
FIG. 11 is a flowchart for describing game execution control for a game apparatus according to an exemplary embodiment.
Figure 12:
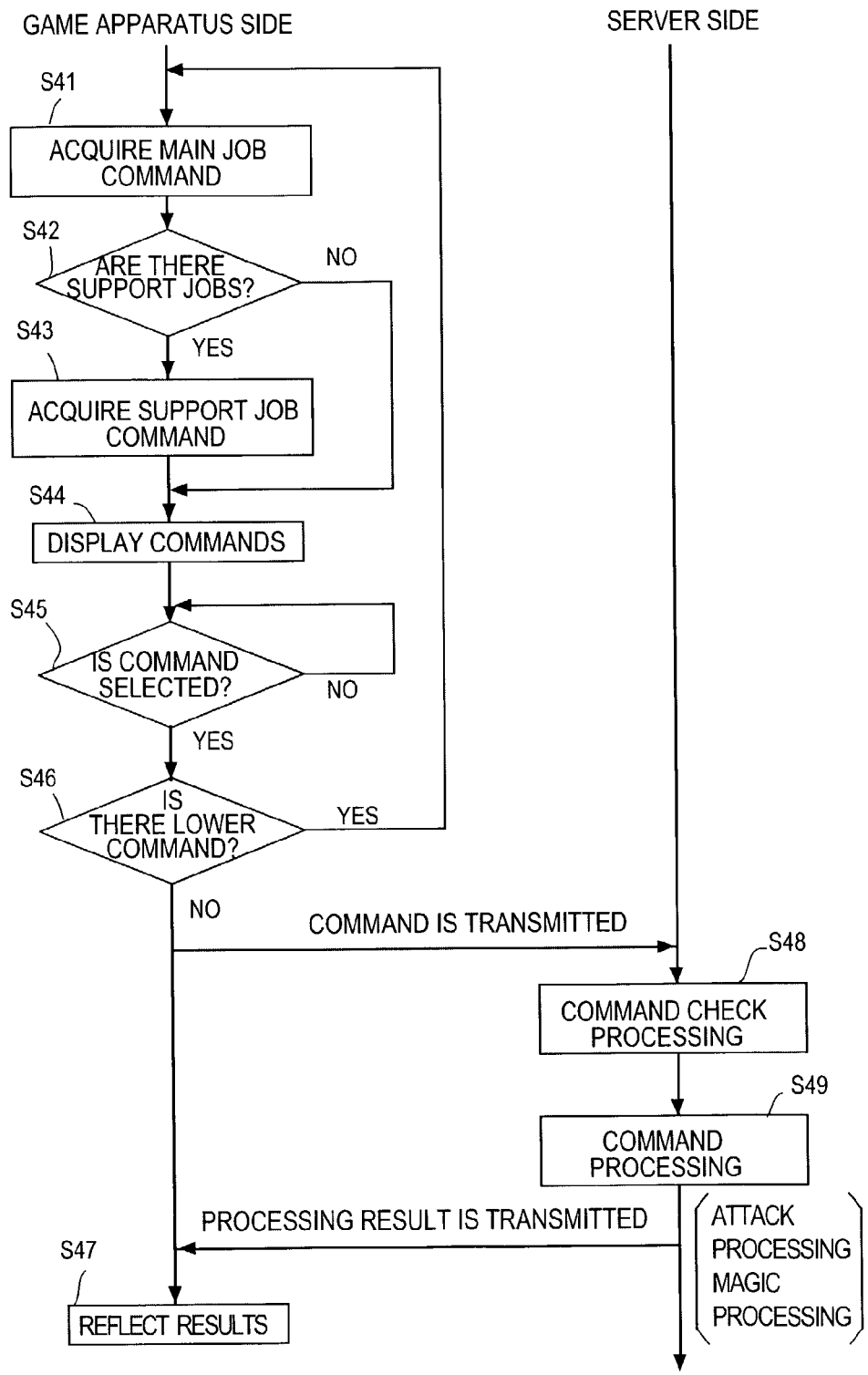
FIG. 12 is a diagram for describing command processing of an exemplary embodiment.
Figure 13:
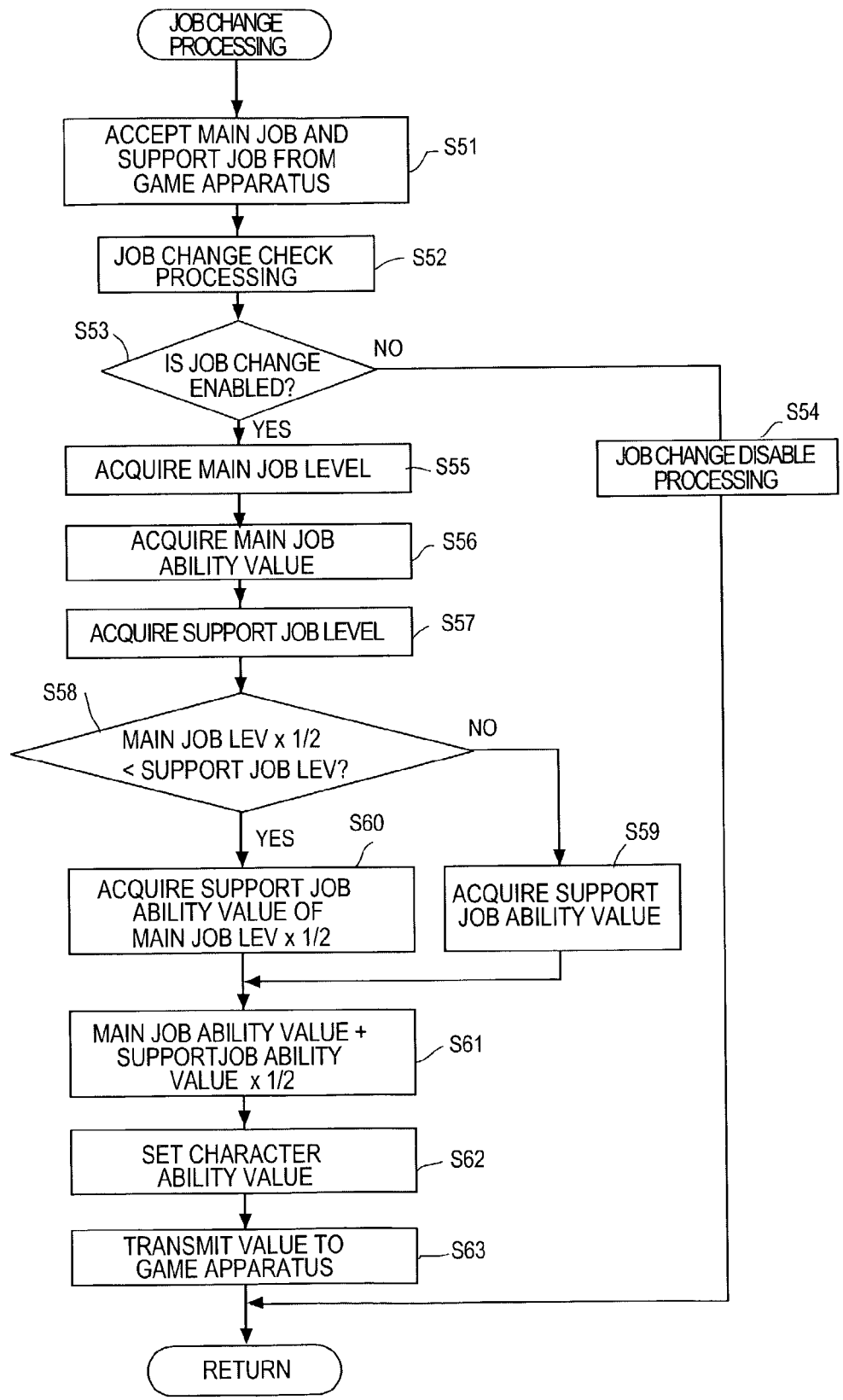
FIG. 13 is a diagram for describing decision control of the character characteristic information value accompanying a job change of an exemplary embodiment.
Figure 14:
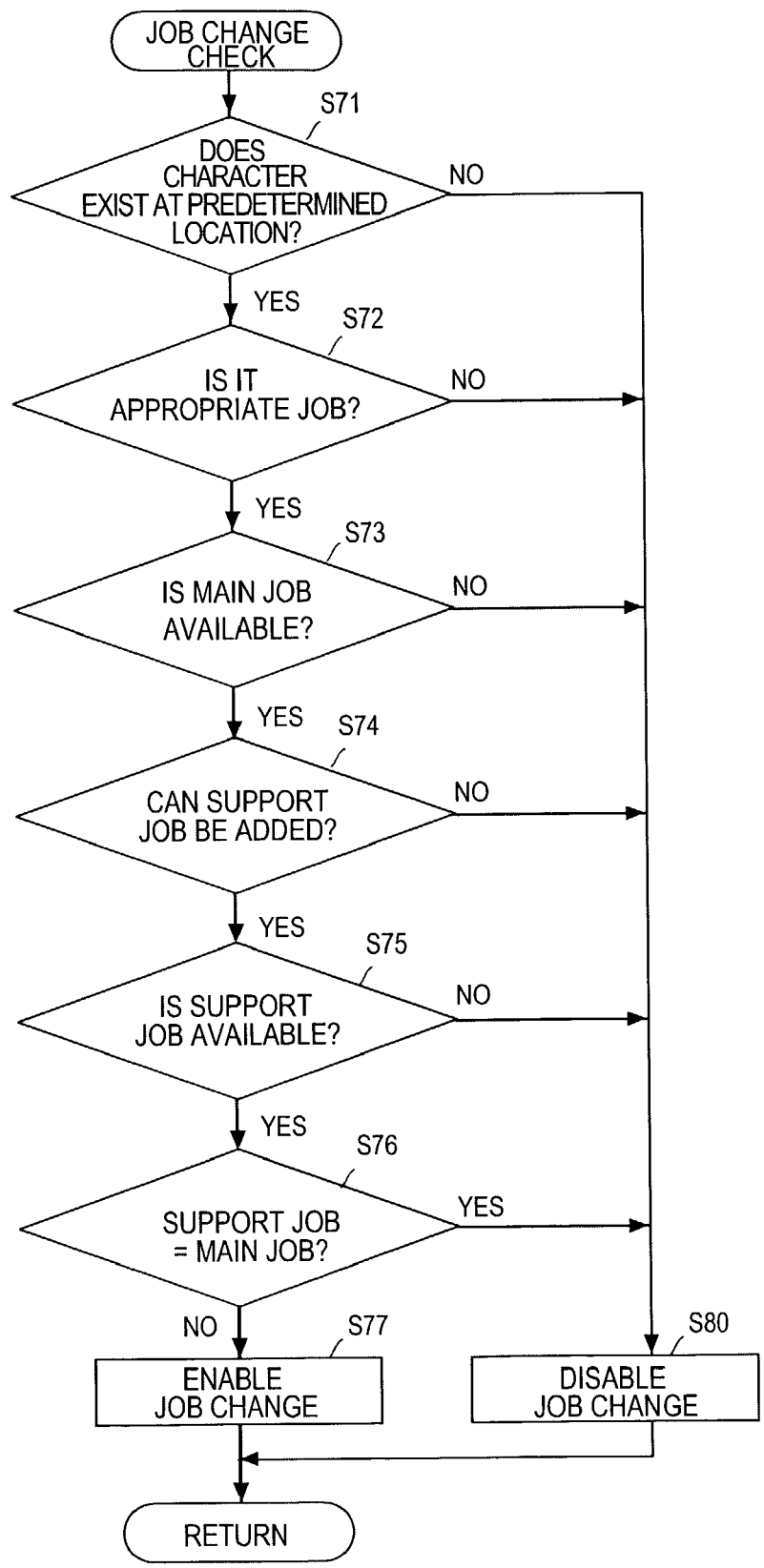
FIG. 14 is a diagram for describing a job change check control of an exemplary embodiment.

FIG. 11 is a flowchart for describing game execution control of the game apparatus according to an exemplary embodiment; FIG. 12 is a diagram for describing command processing of an exemplary embodiment; FIG. 13 is a diagram for describing determination control of character characteristic information values by the server group 102 accompanying job changes, according to an exemplary embodiment; and FIG. 14 is a diagram for describing the job change check control of an exemplary embodiment.

To begin with, overall game control is described while referencing FIG. 11. This processing is started when the game apparatus main body 2 executes the game program stored on the CD-ROM 4 of the game apparatus.

In step S1 of FIG. 11, the initial processing is executed, that is, the necessary programs are read out from the CD-ROM 4 to the game apparatus main body 2 and stored in RAM 12. Then display of an initial screen (such as a manufacturer's logo), check of the memory card 5 and display of a title screen are performed, and basic processing including loading of necessary data is performed.

In the subsequent step S2, it is determined whether there is a command to access the server through the network in order to execute the network game at the point in time where initial processing ends. If there is no server access command, processing proceeds to step S3, and it is determined whether the off-line game, instead of the network game, is to be executed using solely the game data stored in the loaded CD-ROM 4. In the case of executing the off-line game, processing proceeds to step S4, and the game apparatus executes the game independently. In the case where there is no command to execute the off-line game in step S3, processing returns to step S2.

Meanwhile, in step S2, in the case where execution of the network game is designated and an access request is sent to the server, processing proceeds to step S10, where the server group is accessed to receive authentication, and connection status with, for example, the game server group 116 is made.

In the subsequent step S11, game data relating to the game executed by the player, such as job-specific character value information retained on the server side is received from the server side.

Next, in step S12, whether to execute a new game or continue a game previously executed but not completed is selected. In the case where a new game is not executed, processing proceeds to step S15, and the network game is executed from the point of suspension in accordance with the game data received from the server side. Meanwhile, in step S12, in the case where execution of a new game is decided, processing proceeds to step S13, and a job is selected from the jobs allowing selection at the beginning of a new game. The main jobs can be selected at first, however, the support jobs cannot be selected at the initial time. More specifically, the main job selection command is prompted by receiving the main job selection screen as shown in FIG. 15 from the server 102, or by displaying the selection screen in accordance with the program read out in the initial processing.

Figure 15:
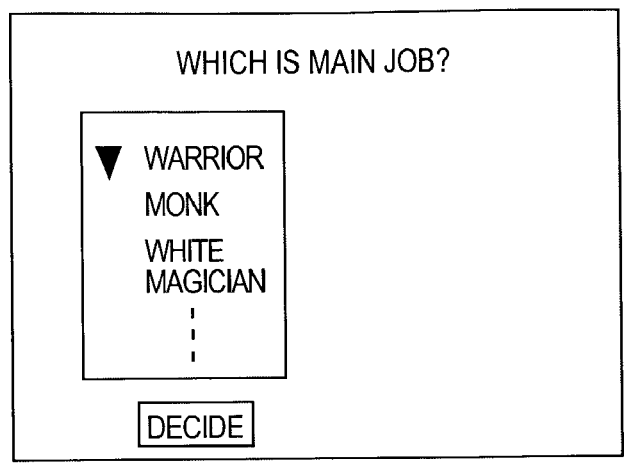
FIG. 15 is a diagram illustrating an example of a main job selection screen of an exemplary embodiment.

FIG. 15 is a diagram illustrating an example of the main job selection screen according to an exemplary embodiment. In an exemplary embodiment, not only on the main job selection screen, but also on other screens, only the objects (such as commands and items) capable of being input are displayed and the objects that cannot be input are not displayed. Accordingly, accidental invalid input may be prevented.

The jobs to be displayed on the selection window shown in FIG. 15 are the above-mentioned jobs that are capable of being engaged in from the beginning. That is, six jobs, such as "Warrior" with job number 1, "Monk" wih 2, "White Magician" with 3, "Black Magician" with 4, "Red Magician" with 5, and "Thief" with 6, are displayed for selection on the selection window. In FIG. 15, since the job represented with a "▼" mark is a job being designated, the job with the "▼" mark is selected as the main job when the "Decide" button displayed beneath the window is selected.

Next, in step 14 of FIG. 11, the game apparatus transmits job selection results to the server side. It should be noted that confirmation of the main job selection results may be requested prior to transmission or as confirmation operation for the transmission results. Performing this confirmation makes it less likely that an undesired job will be undertaken.

It should be noted that in an exemplary embodiment, only the main jobs are selectable in the initial status, however, it is naturally possible to engage secondary jobs, to be described later, from the initial status. With the game apparatus, the status of the operated character is determined from the characteristic value information received in step S11.

Next, in step S15, the game operation of the character is begun in accordance with the job determined in step S13, and the actual game is executed. In the case of a network game, a player can play a game with players operating other game apparatuses via the network 100.

Processing proceeds to step S16 in the case where, for example, the game screen changes in conformity with game progression, the controller 30 is operated, or a scene changes. In step 16, it is determined whether a command is input. If a command is input, processing proceeds to step S17, and command input processing, to be described later, is executed. Then, in step S18, command execution processing is performed, and processing returns to step S15.

Meanwhile, in the case where it is determined that a command is not input in step S16, processing proceeds to step S29, and it is determined whether a job change is requested. If a job change has not been requested, processing proceeds to step S34, and character movement control is performed if a character movement is indicated. If the indication is other than the above, predetermined corresponding processing is executed, for example, an operation in response to the indication is performed.

Meanwhile, if a job change is requested in step S29, processing proceeds to job change processing beginning with step S30, and a part of or all jobs that have been selected are changed to other changeable jobs. This is described in more detail in the following.

To begin with, in step S30, main job selection processing is executed. The processing in step S30 is basically similar to the processing in step S13. That is, the main job selection command is prompted by receiving the main job selection screen shown in FIG. 15 from the server 102, or by displaying the selection screen in accordance with the program read out in the initial processing. In this case, the job represented with a "▼" mark is selected as the main job by moving the "▼" mark up and down to the position of the job to be selected using the cross-shape keys and by pressing the "Decide" button displayed beneath the window.

Figure 16:
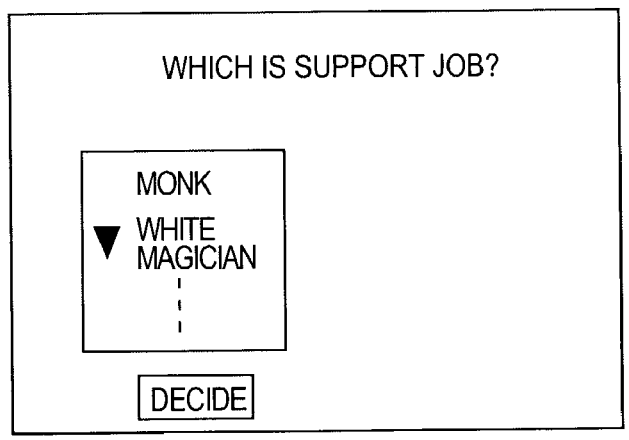
FIG. 16 is a diagram illustrating an example of a support job selection screen of an exemplary embodiment.

Next, in step S31, support job selection processing is performed. A support job selection screen is displayed in step S31. FIG. 16 illustrates an example of a support job selection screen display according to an exemplary embodiment. In the exemplary embodiment, since a main job has already been selected, the display of the main job is removed from the selectable jobs display (shown in FIG. 15) in the display screen example of FIG. 16. In other words, since "Warrior" was selected as the main job, FIG. 16 represents a display example where "Warrior" has been removed from the job selection list.

It should be noted that in an exemplary embodiment, the job change is enabled after a certain degree of experience is gained, so a job change cannot be requested before that experience is gained.

When the main job and support job are selected in steps S30 and S31, respectively, the game apparatus transmits the selection results to the server side in the subsequent step S32.

It should be noted that confirmation of the selection results of the main job and support job may be requested prior to transmission or as a confirmation operation for transmission results. By performing this confirmation, it is possible to prevent engaging in an undesired job.

Figure 17:
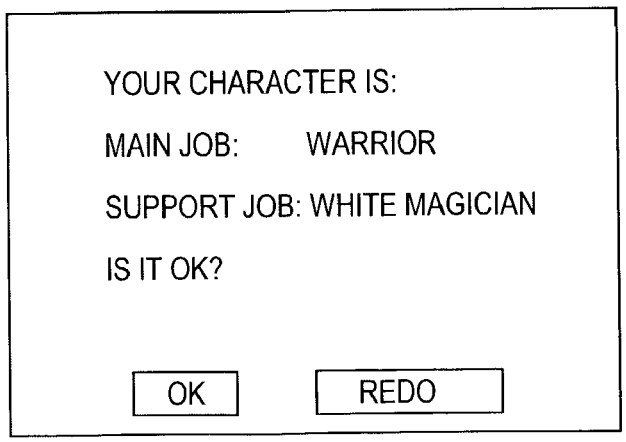
FIG. 17 is a diagram illustrating an example of the display of a job selection result confirmation screen according to an exemplary embodiment.

FIG. 17 illustrates an example of the job selection result confirmation screen display according to an exemplary embodiment. Here, it is possible to "Redo" the selection as shown in FIG. 17, and processing returns to step S30 again when the "Redo" command is selected. Accordingly, it is possible to positively confirm the selection results.

When job selection is complete, in step S32, the job selection results are transmitted. The server side, which receives the job selection results, extracts the characteristic values corresponding to the selected jobs while referencing the tables shown in FIG. 7 and FIG. 8. For the support jobs, ability values to be assigned to the characters according to the predetermined weight are calculated, these ability values are added to those of the respective main jobs to determine ability values for characters with a selected job, and the characteristic value information is generated and sent back to the game apparatus. The game apparatus then determines the status of the operated characters from the characteristic value information received in step S33.

Next, processing proceeds to step S15, where game operation of the characters is started in the status that has been determined and the game is executed.

The above-mentioned command processing in step S17 and step S18 is described below while referencing FIG. 12.

When display of the command input screen is requested from the game apparatus, processing shifts to the processing in FIG. 12, and to begin with, a list of commands that can be executed with the main job is acquired from the server side in step S41. Subsequently, in step S42, it is determined whether a support job is selected. In the case where a support job is not selected, processing proceeds to step S44.

Meanwhile, in the case where a support job is selected in step S42, processing proceeds to step S43, and a list of commands that can be executed with the support job is acquired. Processing then proceeds to step S44.

In step S44, the command lists acquired in steps S41 and/or S43 are synthesized and displayed as selectable commands. Then, in step S45, it is monitored for the selection of one of the displayed commands.

When one of the commands is selected, processing proceeds to step S46, and it is determined whether a lower selection command group which uses the selected command as a keyword, exists. In the case where a lower command group exists, processing returns to step S41, and the lower command is acquired. For instance, corresponding cases may include the "Magic" command being selected and then selecting the specific magic; or the "Item" command being selected and then selecting the specific item.

In the case where no lower command exists in step S46, the selection command is transmitted to the server side. The server side that receives this command, performs a command check in step S48, and executes the command processing in step S49 (corresponding to step S18) for performing attack processing, magic processing, recovery processing, and the like if the checked command is an executable command or a valid command selection instruction.

The server side then transmits the processing results to the game apparatus side. The game apparatus that receives these processing results, reflects the received processing results in step S47.

The details of the server side control of the above-mentioned job change process are described while referencing FIG. 13.

When the selection results of the newly selected job are transmitted from the game apparatus side to the server side in accordance with the job change processing on the game apparatus side shown in step S30 through step S32 in FIG. 11, processing on the server side shifts to the processing shown in FIG. 13.

To begin with, in step S51 of FIG. 13, the main job and support job are received from the game apparatus, which is the client side from the perspective of the server side. It should be noted that a support job is not transmitted in the case where only a main job is selected.

Next, in the subsequent step S52, in the case where special conditions are required for engaging in a job, such as 7: Knight, 8: Dark Knight, 9: Beast Tamer, 10: Bard, 11: Ranger, 12: Samurai, 13: Ninja, 14: Dragon Knight, or 15: Summoner, job change check processing is performed to examine whether those conditions are satisfied. If the job can be engaged in from the initial status, such conditions are considered satisfied.

Next, in step S53, it is examined whether the job change conditions are satisfied, based on the results of the check performed in step S52. If the newly selected job cannot be engaged in, processing proceeds to step S54, where job change disable processing is performed and "job change not permitted" is returned with the reason why the job cannot be changed.

Generally, since only selectable jobs are displayed on the selection screen, a job that cannot be engaged in is not displayed. However, for job changes, if the user fraudulently changes data stored in a memory in association with game progress, "job change not permitted" is returned to the user.

Meanwhile, if job change conditions are determined to be satisfied in the job change check in step S53, processing proceeds to step S55, where main job level is acquired. More specifically, if the character, after a job change is made, has experienced the main job in the past and has the job level achieved at that time, the achieved level is retrieved. In the case where this is the first job change, the first level is obtained.

Next, in step S56, the main job growth pattern corresponding to the acquired level, after the job change; the experience value obtained by the operated character up to this point; and the operated character's new ability value corresponding to the attained level specific to the main job, are acquired.

Next, in step S57, if the support job, after the job change, has been experienced in the past, and if the character had the job level achieved prior to the change, the job level is retrieved. In the case of an initial job, the first level is acquired.

In the subsequent step S58, it is checked whether ½ of the main job level acquired in step S55 is lower than the support job level acquired in step S57. In the case where ½ of the main job level is not lower than the support job level, processing proceeds to step S59. In step S59, the growth pattern of the support job is acquired, and the ability value of the support job according to the table in FIG. 8 corresponding to the pattern acquired in step S57 and the growth pattern of the support job is calculated and acquired. Processing then proceeds to step S61.

Meanwhile, in the case where it is determined that ½ of the level of the main job is lower than the support job level in step S58, processing proceeds to step S60. In step S60, the growth pattern of the support job is acquired and the ability value of the support job according to the table in FIG. 8 corresponding to ½ of the main job level and the growth pattern of the support job is calculated and acquired. Processing then proceeds to step S61.

In step S61, the ability value, which is half (½) of the newly acquired ability value of the operated character specific to the support job found in step S59 or step S60 is added to the newly acquired ability value of the operated character specific to the main job found in step S56.

Then, in the subsequent step S62, the character ability value found in step S61 is set as the new ability value of the operated character after the job change. Next, in step S63, the new ability value acquired in step S62 is transmitted to the game apparatus side and processing returns.

It should be noted that if the support job is not selected, the ability value found in step S56 is regarded as the ability value of the operated character.

An example of the ability value result of an operated character according to an exemplary embodiment is shown. FIG. 18 is a diagram illustrating an example of the ability value of an operated character according to the exemplary embodiment. In the exemplary embodiment, it is possible for the same user to acquire multiple ID numbers and operate the different characters for each ID number to execute the network game. In the example in FIG. 18, the jobs and ability values of the operated characters are illustrated in the case where the user executes a game by logging into the server with the ID "HA000001".

The example in FIG. 18 shows that the "Warrior" with job number 1 is selected as the main job and the "White Magician" with job number 3 is selected as the support job. In addition, the current ability value examples of engaging in these two jobs are represented. This information on the operated characters is the information retained in the game apparatus and on the server side.

Thus, it is possible to obtain characters having different characteristics depending on which job is selected as the main job while selecting multiple jobs by adopting ability values having different weights for the main job ability value and support job ability value. As a result, it is possible to achieve various characteristics of the operated characters rather than the number of jobs to increase variety in the game and make it more interesting.

Even in such a case, it is possible to unify the data table that is used as a reference for acquiring the ability values for the main job and support job. In addition to common usage by job, this unification achieves a diverse game requiring a smaller memory capacity.

Moreover, it is possible to ignite a spirit of adventure as the game progresses by adding an ability value corresponding to the lower level of either the main job or support job when adding the ability value of the support job, while regarding the main job level as a reference for calculating the ability value. It is therefore possible to easily realize the degree of growth when a new job is selected.

The details of the above-mentioned job change check processing in step S52 is described while referencing FIG. 14.

To begin with, in step S71 of the job change check process, it is determined if the operated character that desires a job change exists at the location where the job change operation is allowed. For instance, should a job change be allowed at the save point, it is determined whether the character exists at the save point. Then if a specific store or room where a job change is allowed is specified as the location of the job change, it is determined whether the character is in the store or room. If the character is not at the location where a job change is allowed, processing proceeds to step S80.

In step S80, it is determined that a job change is not allowed as a result of the job change check, and after a job change has been disallowed, the processing returns.

Meanwhile, if it is determined in step S71 that the operated character is at the location where a job change is allowed, processing proceeds to step S72, and it is determined whether the desired job change is appropriate. For instance, the job types that can be engaged in have been limited in an exemplary embodiment, and if a job other than the above-mentioned jobs numbered 1 through 15 is selected, it is determined as being inappropriate.

In an exemplary embodiment, since jobs are specified using the above-mentioned numbers 1 through 15, if the sharing of information between the game apparatus side and server side is not normal due to unauthorized procedures being performed on the game apparatus side, it is assumed that an unauthorized job selection is made. Accordingly, it is determined that a job change is inappropriate in such a case. If the job change is inappropriate, processing proceeds to step S80.

Meanwhile, in step S72, if a job change is determined as being appropriate, the processing proceeds to step S73, and it is determined whether the character can engage in the selected main job, that is, it is determined whether the main job is available. As described above, some jobs require that the character achieve a certain level or higher, or clear predetermined events. If these conditions are not satisfied, a job change for the main job is determined as being inappropriate, and processing proceeds to step S80.

If engaging in the main job is determined as being appropriate in step S73, processing proceeds to step S74, and it is determined whether the support job can be added. In order to engage in the support job, the character is required to achieve a certain level. If the character has not achieved that level, engaging in the support job is determined to be inappropriate, and processing proceeds to step S80.

If it is determined that the support job can be added in step S74, processing proceeds to step S75, and it is determined whether the character can engage in the selected support job (whether the support job is available). As described above, some jobs require that the character achieve a certain level or higher, or clear predetermined events. Therefore, if these conditions are not satisfied, a job change to the support job is determined as being inappropriate, and processing proceeds to step S80.

Meanwhile, in the case where the job change to the support job is determined as being appropriate in step S75, processing proceeds to step S76, and it is determined whether the main job and support job are identical.

In an exemplary embodiment, the main job and support job must be different jobs. If the main job and support job are identical, the job change is determined as being inappropriate, and the processing proceeds to step S80.

However, if the main job and support job are not identical, the job change command is determined as being appropriate, and processing proceeds to step S77, whereby as a result of the job change check, it is determined that a job change is authorized. After the job change has been allowed, the processing returns.

It should be noted that the server side specifies the operated characters by using the ID numbers assigned to each user, and retains job histories that the characters have experienced as a batch table. A configuration example of the job history management table on the server side will be described. FIG. 19 is a diagram illustrating a configuration example of a job history management table on the server side according to an exemplary embodiment.

The server side manages the job history levels in blocks that the operated characters engage or have engaged in for each user ID as shown in FIG. 19. In the example in FIG. 19, the character having user ID "HA00001" is a "Warrior" whose job number is 1 and level (LV) is 10. The availability flag is indicated (flag is 1) for that character, therefore it is possible for the character to engage in this job. The level of the "Monk" whose job number is 2 is 7. It is possible to engage in this job since the availability flag is indicated. In addition, it is possible to add the support job since the currently acquired points of the character is 3500 and the sub job enabled flag is indicated.

Meanwhile, the character having user ID "HA000002" is a "Warrior" whose job number is 1 and level is 3. It is possible for the character to engage in this job since the availability flag is indicated. The level of the "Monk" whose job number is 2 is 0, and the availability flag is indicated. It is therefore possible for the character to engage in this job. However, it is impossible to add the support job since the currently acquired points of this character with ID "HA000002" is only 400 and the sub job enabled flag is not indicated (flag is 0).

It should be noted that the availability flag and sub job enabled flag are set when predetermined conditions are satisfied during game play.

As described above, it is possible to provide a highly interesting game apparatus and a game control method capable of effectively increasing the job types to be assigned to the characters while keeping increases in necessary memory capacity in check.

In addition, it is possible to naturally diversify the character characteristics and to improve the interest level of the game since multiple jobs can correspond to one character and the character characteristic value is calculated based on the respective characteristic value of each job.

In this case, by strongly emphasizing the main job characteristics rather than the support job, character characteristics may vary greatly depending on which job is selected as the main job, and the diversity of the game further increases.

It is also possible to give variation according to the growth patterns of the operated characters and to present the user with a challenge by keeping character reflection for a support job lower than for a main job, for instance, by keeping weighting to reflection effects for the support job characteristic values to 50% of that for the main job characteristic values, or lower, and calculating the character characteristic value on the basis of the characteristic value found by adding the weighted characteristic values of each job together.

In addition, for instance, by keeping the support job characteristic value to 50% of the main job characteristic value through adoption of ability values having different weights for the main job ability value and the support job ability value, it is possible to make a character having different characteristics according to which job is selected as the main job while selecting multiple jobs, and thus achieve a greater variety of operated character characteristics than with just the number of jobs, increase the diversity of the game, and make a more interesting game.

In such a case as well, it is possible to unify the data table used as a reference for acquiring the ability value between the main job and support job, to further unify in addition to the common use for each job, and to achieve a diverse game with a small amount of memory.

Moreover, during calculation of the ability value, while regarding the main job level as the reference level, the ability value corresponding to the lower level of either the main job or support job may be added when adding the support job ability value. Accordingly, it is possible to ignite a spirit of adventure throughout the game. Since the degree of growth can be easily appreciated when a new job is selected, a sense of challenge may be presented to the user.

Furthermore, it is possible for the user to correctly and quickly grasp which command is executable since only the available commands are displayed on the selection window.

Other Embodiments

With the above description, an example using a CD-ROM drive 16 or server group 102 as a means for supplying the program to the game apparatus is described. However, the present invention is not limited to the above-mentioned example. For example, all programs may be stored on the HDD18, and the desired program to be executed may be selected from the stored program group and executed.

Alternatively, it is allowable to execute a game by loading the memory card 5 into the game apparatus, wherein the memory capacity of the memory card 5 is specified so as to contain a capacity capable of storing all game programs and game data; and all information required for executing the game is stored in the memory card 5.

In addition, with the above-mentioned game system according to an exemplary embodiment, the case where a single game apparatus executes a single network game, or multiple game apparatuses execute a single network game together with other game apparatuses under the control of the server group 102, is described as an example. Accordingly, the game proceeds by transmitting the information needed for the game to proceed between the server group 102 and the game apparatus.

However, the present invention is not limited to this example. For example, a game system may store all information needed for executing the game on a recording medium, such as the above-mentioned CD-ROM, memory card, HDD, DVD, or magneto optical disk, and perform each function needed for executing the game with the game apparatus independently. In this case, since the game apparatus stores all information in addition to the above-mentioned tables, the game apparatus may execute each game control such as the job change process independently.

In addition, a game system may be possible that receives all or a part of the information needed for the game from the server group 102 prior to game execution or at the necessary time during execution of the game. The information is received by connecting the game apparatus to the server group 102 via a communication medium, processing the information needed for executing the game that is received by the game apparatus independently, and executing the above-mentioned game without being controlled for game progression by the server group 102. In this case, all of the information needed for the game being executed is retained in the game apparatus during game progression control, and the game is executed using the retained information.

In addition, with the above description, the case where the present invention is achieved by using a home game machine as a platform is described, however, the present invention may also be achieved using a general-purpose computer, such as a personal computer, or an arcade game machine as a platform.

The above-mentioned embodiment and modified example thereof store programs and data for achieving the present invention on a CD-ROM, and uses the CD-ROM as an information recording medium. However, the information recording medium is not limited to a CD-ROM. Other computer readable magnetic or optical recording media, such as a magnetic disk, or ROM card, or semiconductor memory may be used.

The program and data for achieving the present invention are not limited to the format provided by the medium, such as a CD-ROM that is freely removable from the game machine or computer. The format used may allow the saved data for achieving the present invention to be received from other apparatuses connected via communication lines, such as a server group, and to be recorded in the memory. Furthermore, the format may allow the above-mentioned programs and data to be recorded in memory on the other apparatus side that is connected via the communication lines, and used via the communication lines.

Accordingly, with the present invention, an interesting game apparatus and a game control method capable of effectively increasing the job types to be assigned to the characters may be provided while controlling the amount of memory which is needed.

While the invention has been described with reference to particular example embodiments, further modifications and improvements which will occur to those skilled in the art, may be made within the purview of the appended claims, without departing from the scope of the invention in its broader aspect.

What is claimed is:

1. A game system, which, when executing a game by operating a character in accordance with a game program, provides a plurality of types of characteristics of the character and advances the game by assigning at least one type of characteristic to the character from among the plurality of types of characteristics, the game system comprising:
    a main characteristic assigning system that assigns one of the types of characteristics to the character, the assigned type of characteristic serving as a main type of characteristic of the character;
    a storage that stores a plurality of predetermined sequences of characteristic value information that determines characteristic values of the character for each character level, and also stores a plurality of growth pattern values of the assigned characteristic type, each of the plurality of growth pattern values corresponding to one of the predetermined sequences;
    an application system that extracts characteristic value information corresponding to a character level and the growth pattern values of the assigned type of characteristic from the stored characteristic value information, and applies the characteristic values of the character in accordance with the extracted characteristic value information; and
    a controller that controls the character according to the characteristic values applied by the application system,
    wherein the plurality of growth pattern values are combined based on the plurality of assigned characteristic types,
    wherein each of a plurality of growth patterns comprises a stored predetermined sequence of characteristic value information, each predetermined sequence representing a progression of the characteristic values corresponding to each of the assigned characteristic types, and
    wherein the growth pattern values are combined by weighting and adding the characteristic value information in the predetermined sequences, based on the assigned characteristic type corresponding to the characteristic value information.

2. The game system according to claim 1, wherein the application system weights characteristic value information of the main type of characteristic assigned by the main characteristic assigning system with a first factor to generate a first weighted value, weights characteristic value information of an assigned support type of characteristic with a second factor to generate a second weighted value, and sums the first and second weighted values.

3. The game system according to claim 1, wherein the storage stores combined information of the plurality of character growth pattern values for every characteristic of the character.

4. The game system according to claim 1, wherein the storage stores characteristic value information common to a plurality of different characters; and the application system applies the stored characteristic value information, the characteristic value information being assigned for each of the plurality of different characters.

5. The game system according to claim 1, further comprising:
- a game apparatus that includes the main characteristic assigning system, and the controller; and
- a server apparatus that connects to the game apparatus through a communication medium, and includes the storage and the application system;
- wherein the game apparatus assigning character characteristic using the main characteristic assigning system; and the server apparatus receiving characteristic assigning results from the game apparatus, finding and applying characteristic value information for the character, and providing the applied characteristic value information to the game apparatus; and wherein the game apparatus controls the character according to the provided characteristic value information.

6. A game system, which, when executing a game by operating a character in accordance with a game program, provides a plurality of types of characteristics of the character and advances the game by assigning at least one type of characteristic to the character from among the plurality of types of characteristics, the game system comprising:
- a storage that stores a plurality of predetermined sequences of characteristic value information that determines characteristic values of the character for each character level, and also stores a plurality of growth pattern values of the assigned characteristic type, each of the plurality of growth pattern values corresponding to one of the predetermined sequences; and
- an application system that extracts characteristic value information corresponding to a character level and the growth pattern values of the assigned types of characteristics from the stored characteristic value information, and applies the extracted characteristic value information to the assigned types of characteristics,
- wherein the plurality of growth pattern values are combined based on the plurality of assigned characteristic types,
- wherein each of a plurality of growth patterns comprises a stored predetermined sequence of characteristic value information, each predetermined sequence representing a progression of the characteristic values corresponding to each of the assigned characteristic types, and
- wherein the growth pattern values are combined by weighting and adding the characteristic value information in the predetermined sequences, based on the assigned characteristic type corresponding to the characteristic value information.

7. A game control method in a game apparatus, which, when executing a game by operating a character in accordance with a game program, provides a plurality of types of characteristics of the character and advances the game by assigning at least one type of characteristic to the character from among the plurality of types of characteristics, the game control method comprising:
- assigning one of the types of characteristic to the character, the assigned type of characteristic serving as a main type of characteristic of the character;
- storing, within a storage, a plurality of predetermined sequences of characteristic value information that determines characteristic values of the character for each character level, and a plurality of growth pattern values of the assigned characteristic type, each of the plurality of growth pattern values corresponding to one of the predetermined sequences;
- extracting characteristic value information corresponding to a character level and the growth pattern values of the main type of characteristic from stored characteristic value information;
- applying characteristic values of the character in accordance with the extracted characteristic value information;
- controlling the character according to the applied characteristic values, and
- outputting an image of the controlled character to a display,
- wherein the plurality of growth pattern values are combined based on the plurality of assigned characteristic types,
- wherein each of a plurality of growth patterns comprises a stored predetermined sequence of characteristic value information, each predetermined sequence representing a progression of the characteristic values corresponding to each of the assigned characteristic types, and
- wherein the growth pattern values are combined by weighting and adding the characteristic value information in the predetermined sequences, based on the assigned characteristic type corresponding to the characteristic value information.

8. The game control method according to claim 7, wherein the characteristic value information of the main type of characteristic is weighted with a first factor to generate a first weighted value, characteristic value information of a support type of characteristic is weighted with a second factor to generate a second weighted value, and the first and second weighted values are summed.

9. The game control method according to claim 7, comprising:
- assigning the main type of characteristic and controlling the character with a game apparatus; and
- controlling, with a server apparatus, the server apparatus being connected to the game apparatus through a communication medium, includes the storage, and applying an application characteristic value to the character;
- wherein the server apparatus receives from the game apparatus character assignment results to find and apply characteristic value information for the character, and provides the applied characteristic value information to the game apparatus; and
- wherein the game apparatus controls the character according to the provided characteristic value information.

10. A game control method in a game apparatus, which, when executing a game by operating a character in accordance with a game program, comprises a storage that stores a plurality of types of characteristics of the character, and is capable of advancing the game by assigning at least one type of characteristic to the character from among the plurality of types of characteristics, the game control method comprising:

providing a combination of parameters having a plurality of growth patterns for each parameter, based on predetermined sequences of stored characteristic value information;

extracting characteristic value information corresponding to a character level and a plurality of growth pattern values of the assigned types of characteristics from the stored characteristic value information;

applying characteristic values of the character in accordance with the extracted characteristic value information;

combining the plurality of types of growth patterns according to characteristics to be assigned to the character, and outputting an image of the controlled character to a display, wherein the plurality of growth pattern values are combined based on the plurality of assigned characteristic types, and wherein each of the plurality of growth pattern values corresponds to one of the predetermined sequences, wherein each of a plurality of growth patterns comprises a stored predetermined sequence of characteristic value information, each predetermined sequence representing a progression of the characteristic values corresponding to each of the assigned characteristic types, and wherein the growth pattern values are combined by weighting and adding the characteristic value information in the predetermined sequences, based on the assigned characteristic type corresponding to the characteristic value information.

11. A computer readable recording medium on which a game program executed by a game apparatus is recorded, which, when executing a game by operating a character in accordance with the game program, comprises a storage that stores a plurality of types of characteristics of the character, and advances the game by assigning at least one type of characteristic to the character from among the plurality of types of characteristics, the game program causing the game apparatus to execute:

assigning a main type of characteristic to the character;

storing a plurality of predetermined sequences of characteristic value information that determines characteristic values of the character for each character level, and a plurality of growth pattern values of the assigned characteristic type, each of the plurality of growth pattern values corresponding to one of the predetermined sequences;

extracting characteristic value information corresponding to a character level and growth pattern values of the assigned characteristic type from stored characteristic value information;

applying characteristic values of the character in accordance with the extracted characteristic value information; and controlling the character according to the applied characteristic values, wherein the plurality of growth pattern values are combined based on the plurality of assigned characteristic types, wherein each of a plurality of growth patterns comprises a stored predetermined sequence of characteristic value information, each predetermined sequence representing a progression of the characteristic values corresponding to each of the assigned characteristic types, and wherein the growth pattern values are combined by weighting and adding the characteristic value information in the predetermined sequences, based on the assigned characteristic type corresponding to the characteristic value information.

12. The computer readable recording medium according to claim 11, wherein the game program further causes the game apparatus to weight the characteristic value information of the main type of characteristic with a first factor to generate a first weighted value, weight characteristic value information of a support type of characteristic with a second factor to generate a second weighted value, and sum the first and second weighted values.

13. A computer readable recording medium on which a game program executed by a game apparatus is recorded, which, when executing a game by operating a character in accordance with the game program, comprises a storage that stores a plurality of types of characteristics of the character, and advances the game by assigning at least one type of characteristic to the character from among the plurality of types of characteristics, the game program causing the game apparatus to execute:

storing in the storage a plurality of predetermined sequences of characteristic value information for determining characteristic values of the character for each character level, and a plurality of growth pattern values of the assigned characteristic types, each of the plurality of growth pattern values corresponding to one of the predetermined sequences;

extracting characteristic value information corresponding to a character level and growth pattern values of the assigned types of characteristic from the stored characteristic value information;

applying characteristic values of the character in accordance with the extracted characteristic value information; and controlling the character according to the applied characteristic values, wherein the plurality of growth pattern values are combined based on the plurality of assigned characteristic types, wherein each of a plurality of growth patterns comprises a stored predetermined sequence of characteristic value information, each predetermined sequence representing a progression of the characteristic values corresponding to each of the assigned characteristic types, and wherein the growth pattern values are combined by weighting and adding the characteristic value information in the predetermined sequences, based on the assigned characteristic type corresponding to the characteristic value information.

14. The computer readable recording medium according to claim 13, wherein the game program further causes the game apparatus to store a combination of information on the plurality of growth pattern values for each of the characteristics.

* * * * *